United States Patent [19]

Buschfeld et al.

[11] Patent Number: 5,011,886

[45] Date of Patent: Apr. 30, 1991

[54] PROCESS FOR PRODUCING MODIFIED PHENOLIC RESIN BONDING AGENTS AND USE THEREOF FOR PRODUCING PARTICLE BOARD

[75] Inventors: Adolf Buschfeld, Alpen; Matthias Lattekamp, Rheinberg; Gerd Ripkens, Kamp-Lintfort; Hans Schittek, Neukirchen-Vluyn, all of Fed. Rep. of Germany

[73] Assignee: Rwe-Dea Aktiengesellschaft fur Mineraloel und Chemie, Hamburg, Fed. Rep. of Germany

[21] Appl. No.: 488,469

[22] Filed: Feb. 26, 1990

Related U.S. Application Data

[63] Continuation-in-part of Ser. No. 681,538, Dec. 14, 1984, abandoned.

[30] Foreign Application Priority Data

Dec. 21, 1983 [DE] Fed. Rep. of Germany ....... 3346153

[51] Int. Cl.$^5$ .............................. C08K 3/20
[52] U.S. Cl. ..................... 524/596; 524/841; 524/843; 524/876; 524/877; 528/164
[58] Field of Search ............... 524/596, 841, 843, 876, 524/877; 528/164

[56] References Cited

U.S. PATENT DOCUMENTS

| 3,215,585 | 11/1965 | Kneipple | 524/595 |
|---|---|---|---|
| 3,265,652 | 8/1966 | Sarjeant | 524/596 |
| 3,547,868 | 12/1970 | Schwartzenburg | 524/841 |
| 3,616,179 | 10/1971 | McCombs | 524/595 |
| 3,666,703 | 5/1972 | Murata | 524/595 |
| 3,790,441 | 2/1974 | Ashall | 524/595 |
| 3,839,251 | 10/1974 | Bornstein | 524/841 |
| 3,862,060 | 1/1975 | Anderson | 524/596 |
| 3,911,046 | 10/1975 | Ackermann | 524/596 |
| 4,285,848 | 8/1981 | Hickson | 524/841 |
| 4,480,068 | 10/1984 | Santos | 524/595 |
| 4,525,227 | 6/1985 | Ripkens | 428/529 |

FOREIGN PATENT DOCUMENTS

| 0685438 | 2/1963 | Canada | 524/841 |
|---|---|---|---|
| 0680094 | 2/1964 | Canada | 524/596 |
| 0912721 | 10/1972 | Canada | 524/841 |
| 2136254 | 1/1972 | Fed. Rep. of Germany | 524/841 |
| 2548476 | 5/1976 | Fed. Rep. of Germany | 524/595 |
| 3027203 | 5/1982 | Fed. Rep. of Germany | 524/595 |
| 51-0041030 | 4/1976 | Japan | 524/595 |
| 52-0060831 | 5/1977 | Japan | 524/841 |
| 53-0092892 | 8/1978 | Japan | 524/596 |
| 57-0128763 | 8/1982 | Japan | 524/595 |
| 58-0098306 | 6/1983 | Japan | 525/61 |
| 2027439 | 2/1980 | United Kingdom | 524/596 |

Primary Examiner—Joseph L. Schofer
Assistant Examiner—J. M. Reddick
Attorney, Agent, or Firm—Thomas H. Whaley

[57] ABSTRACT

The inventive concept is to condense the phenol formaldehyde resins to a higher molecular weight than usual so far. Subsequent addition of urea thereto reduces viscosity to normal levels and increases solid content.

The added urea does not take part in condensation reaction but partly reacts in the alkaline medium with formaldehyde to methylol urea (in a so called equilibrium reaction), which is formaldehyde donor for the phenol formaldehyde crosslinking reaction during the pressing of the particle board.

The present invention relates to a process for producing modified phenolic resin bonding agents, characterized by preparing as known per se phenol-formaldehyde resins with a viscosity of more than 300 mPa.s (at 20° C.) and with a solids content of from 65 weight percent and adding to the viscous phenolic resin solutions obtained 5 to 50 weight percent urea, based on the weight of the phenolic resin solution, the phenol formaldehyde resins being prepared with as much alkali as is required to secure that the modified resin solution resulting therefrom contains 2 to 12 weight percent total alkali calculated as NaOH.

The solids content of the modified resin solutions ranges of from 20 to 65 weight percent, preferably of from 40 to 65 weight percent.

The modified resin solutions prepared according to invention are bonding agents for producing particle boards, preferably triple- or multilayer particle boards.

The modified resin solutions of the invention containing

(Abstract continued on next page.)

2 to 6 weight percent alkali can be used as outer layer bonding agents.

The modified resin solutions of the invention containing 2 to 6 weight percent alkali can be used in combination with isocyanate bonding agents as outer layer and particularly as center layer bonding agents, the bonding agents being applied to the particle either separately or jointly, the latter being preferred.

The modified resin solutions of the invention containing more than 6 to 12 weight percent alkali can be used as outer layer and particularly as center layer bonding agents.

16 Claims, 1 Drawing Sheet

PROCESS FOR PRODUCING MODIFIED PHENOLIC RESIN BONDING AGENTS AND USE THEREOF FOR PRODUCING PARTICLE BOARD

This invention relates to the production of a modified phenolic resin bonding agent and use thereof for producing particle board.

BACKGROUND OF THE INVENTION

Phenolic resins have been used for a long time in the wood materials industry for producing relatively weather-resistant particle boards having perpendicular tensile strength of V-100 quality (German Industrial Standards DIN 68,763). These resins are typically aqueous, alkaline-curing phenol-formaldehyde condensates produced by reacting phenol and formaldehyde in the presence of alkali at a phenol/formaldehyde mole ratio of 1:1.5 to 3.5, preferably 1:1.8 to 3, the quality of the product being mainly determined by the solids content, the viscosity, and the alkali content.

The higher the molarity of these resins, the better the bonding strength and the shorter the curing time and, consequently, the shorter the pressing time for the particle boards. With predetermined solids contents and viscosities, the size of the molecules or the degree of condensation is strongly dependent on the alkali content, i.e. the greater the amount of alkali phenolate present during the reaction, the higher the degree of condensation of these resins.

To lower the hygroscopicity of phenolic resin bound particle boards and to minimize deterioration due to moisture, it has been attempted (more intensely in recent years) to lower the alkali content of the particle board by lowering the alkali content in the resins. Hence, for producing particle boards, it has become customary in recent years to replace the strongly alkaline, 45 to 48% phenolic resins containing about 10 to 12% sodium hydroxide by low-alkaline resins with 5 to 8% NaOH. However, these low alkaline resins have a lower degree of condensation and a poorer bonding strength due to the high degree of penetration into the wood fiber, and a lower reactivity which requires longer pressing times. Moreover, by lowering the alkali content, the resins become less economic, because the price of alkali is less than that of phenol and formaldehyde.

Furthermore, to optimally utilize the particle board production facilities working at high operating cost, oligomeric diphenylmethane-4,4'-diisocyanate (MDI) and acidic-curing mixed condensates based on phenol, melamine, and urea have been used to a growing extent in recent years as bonding agents in addition to the alkaline-curing phenolic resins for gluing conditionally weather-resistant particle board, because they have short pressing times. Despite the considerably higher cost for these bonding agents, the production of particle board is economic because the pressing time is shorter. However, the use of MDI presents difficulties, among others due to its high tackiness to the pressing sheets and involves additional cost.

The phenolic resins described in W.German specification No. 29 44 178 have a degree of condensation which can be maintained at the same high level as that of bonding agents with a higher alkali content by lowering the solids content by dilution with water to 30 to 41% without changing the viscosity. However, as a result of their low solids content, these resins introduce an undesirably high level of moisture into the particle board. It is necessary either to dry the particles to a higher degree than is usual, or to extend the pressing times in order to vaporize the water in the particle board.

The attempts to use as bonding agents resins with a low alkali content, but having the same high degree of condensation as bonding agents with a high alkali content (without lowering the solids content of the resins) have failed up to now, because as is known, water and aqueous alkali are the best solvents for such phenolic resins.

Therefore, it is one object of the invention to develop a low-priced phenolic resin with a low alkali content, but with a high degree of condensation and a high solids content, which is suitable as a sole bonding agent for producing the outer layers of particle boards, or possibly in combination with other bonding agents for producing the center layers of particle boards. Other objects will be apparent to those skilled in the art.

STATEMENT OF THE INVENTION

In accordance with certain of its aspects, this invention is directed to a process for preparing a product aqueous solution of a high-molecular phenol-formaldehyde condensation resin of reduced viscosity which comprises:

adding to a charge aqueous solution of a phenol-formaldehyde condensation resin having a viscosity above 300 mPa.s (at 20° C.) with a solids content of 20 to 65 weight percent preferably in range of 40 to 65 weight percent, and containing about 2 to about 16 weight percent alkali, urea in amount of 5 to 50 weight percent, based on said resin solution.

DESCRIPTION OF THE INVENTION

In practice of the process of this invention according to certain of its aspects, phenol is added to a reaction vessel together with aqueous solution of alkali. The aqueous solution typically is a 45 to 55 wt. %, say 50 wt. % alkali solution added in amount which is sufficient to yield a product modified resin containing 2 to 12 wt. %, preferably 2 to 6 wt. %, alkali, calculated as NaOH.

The reaction mixture is typically heated to 60° C. to 90° C. Formaldehyde is preferably added as an aqueous solution. Commonly available aqueous solutions of formaldehyde (under the name formalin) may contain 25 up to 50 wt. % formaldehyde.

The amount of formaldehyde added is typically 2.2 to 2.8 moles, say 2.6 moles per mole of phenol. This corresponds to 2.5 to 3.2 parts, say about 3 parts of 28 wt. % formalin per part of phenol.

The reaction mixture is maintained at 60° C. to 90° C. say 90° C. and the viscosity is monitored. When the viscosity reaches above 300 mPa.s and up to 20 000 mPa.s, preferably 600 mPa.s to 10 000 mPa.s, for example about 2000, mPa.s (all viscosities measured at 20° C.), in practice of the process of this invention, there is then or after lowering the temperature to say 65° C. added to the reaction mixture, urea in amount of 5 to 50 weight percent, preferably 10 to 40 weight percent based on said reaction mixture.

By lowering the temperature already to 65° C. the condensation reaction is considerably slowed down and comes practically to an halt when the product modified aqueous solution is finally cooled to and kept at 20° C. or below. The urea can also be added at 20° C., however, preferably it is added at higher temperatures since the dissolution enthalpy of the urea can be utilized for accelerating the cooling of the reaction mixture.

It was surprisingly found that by addition of urea to highly condensed phenolic resins which, consequently, have a high viscosity and, in this condition, can be neither used nor stored, low-viscosity phenolic resin solutions with usual solids contents are obtained which are stable during storage and, as the examples show, are most suitable for producing relatively weather-resistant particle boards. The surprising effect that urea considerably lowers the viscosity of high-molecular phenolic resins in the same way as this is achieved with water or aqueous alkali thus allows the production of highly condensed resins, particularly with a low alkali content, which are free from additional water load and are much more stable during storage than the initial product as a result of the reaction of the free formaldehyde with urea by formation of methylol urea (when urea is added).

According to the invention, it is now possible to condense phenol-formaldehyde resins much higher than before since by addition of urea the viscosity is reduced to a level suitable for use while, at the same time, the solids content is increased.

The product modified aqueous solution of the resin is characterized by a solids content (including phenol-formaldehyde resin, urea, methylol urea and sodium hydroxide, etc) of 30 to 65 wt. %, preferably of 40 to 60 wt. %, say about 45 wt. % as measured by evaporation of water at 120° C.

The viscosity of the product modified aqueous solution of the resin (measured at 20° C.) is typically 100 to 1000; say about 250 mPa.s in case of up to 6 wt. % alkali, and 750 mPa.s. in case of between above 6 to 12 wt. % alkali.

It is a particular feature of the product aqueous solutions of resins prepared in accordance with this invention that they are characterized by the ability to maintain their low viscosity over extended periods of storage. For example, a typical product of this invention having a viscosity (at 20° C.) of say about 200 mPa.s may be found after 4 weeks to have a viscosity of only about 800 mPa.s. Typical prior art formulations having the same initial viscosity may be found after 4 weeks to have a viscosity of about three times as much—e.g. 2400 mPa.s. All viscosities are measured at 20° C.

The methylol urea formed by part of the urea with still present formaldehyde in the alkaline medium as known to those skilled in the art does not take part in the condensation reaction, which would result in the undesired urea formaldehyde condensation products that are sensitive to moisture and release formaldehyde, but becomes fully efficient as a formaldehyde donor for the phenol-formaldehyde cross linking reaction during the final curing in the press at high temperatures.

The free formaldehyde content of the product is typically low with under 0.5 wt. % and comparable to that of unmodified phenolic particle board binders. Formaldehyde values of the resulting particle boards are also low as measured by emission tests. When measured by the Perforator Method DIN EN 120, emission values of less than about 5 milligrams are commonly obtained.

The products of this invention are characterized by an alkali content of 2 to 12 wt. %, preferably 2 to 6 w % (by titration, calculated as NaOH).

It is a feature of the aqueous solutions of the resins that they are particularly suitable for use in the preparation of particle board or fiber board. Preparation of these products (containing e.g. particles or fibers of pine or fir) may be carried out by adding to the resin solution a paraffin emulsion as waterproofing agent, and spraying the resin solution onto the fibers or particles. The glued particles or fibers are then pressed at temperatures of 160° to 220° C. to form panels of the desired size.

The modified resins of the present invention with a low alkali content between 2 and 6, preferably 3 and 5 w % (by titration), are most suitable for bonding of the outer-layers of the particle boards. Like all other resins with a low alkali content, such resins of the present invention are not suitable as sole bonding agents for the center-layer particles, because the alkalinity of the resins is too low to secure rapid curing with the presently used short pressing times and low temperatures of only 100°–110° C. reached during pressing in the center-layers of particle boards. However, it was found that when combining the phenolic resins of the invention with diisocyanates such as diphenylmethane-4,4'-diisocyanate and its oligomers (MDI)

toluene-diisocyanate (TDI), triphenylmethane-triisocyanate, hexamethylene-disiocyanate, isophorone-diisocyanate and higher-functional oligomers excellent bonding strengths are obtained which are practically comparable with those of pure isocyanates. This represents a significant economic advantage. Oligomeric diphenylmethane-4,4'-diisocyanate (MDI) is particularly suitable. By using this combination it is possible to achieve even shorter pressing times than with pure isocyanates.

The product modified aqueous solutions of the resins having an alkali content of above 6 to 12%, preferably 7 to 10%, are most suitable as fast-curing bonding agents for the production of particle boards. Since the resins are highly condensed these boards are obtained after very short pressing times which have been unattained to date. Increase in the alkali content may be achieved by addition of alkali into the reactor during resin preparation as well as by addition of alkali to resin having a lower alkali content (2 to 6 wt. %) directly prior to applying the resin to the wood particles. The high degree of condensation of the resin allows a reduction of the pressing time up to 30%.

Contrary to the phenolic resins as described in DE-PS No. 29 44 178, the resins of the invention with a high solids content allow the use of particles with a significantly higher moisture content when the same amount of solid material is applied;

This is a significant economic advantage. For example, when 100 kgs of particles are glued with 8% solid material, based on dry material, using a 53% phenolic resin according to the invention, with an alkali content of 10% the water load is only 7.1 kgs (15.1 kgs of resin solution), as compared to 9.8 kgs (17.8 kgs of resin solution) when using a 45% resin according to DE-PS No. 29 44 178, i.e. during pressing the amount of water vaporized in the center-layer is by 3 kgs water per 100 kgs of particles lower, or it is sufficient to dry the particles before gluing only to a moisture degree that is 3% higher than usually.

And finally the price of the novel resins is lower as a result of their urea content.

When using the process of the invention for producing and employing highly condensed, low-viscous phenolic resins obtained by subsequent addition of urea to high-molecular phenol-formaldehyde condensates, particle boards with excellent bonding strengths are prepared.

When operating outside the scope of this invention, using a process wherein the urea is directly added to the alkaline reaction mixture of phenol and formaldehyde at the beginning of the condensation reaction and the condensation is performed such that comparable viscosities are attained, the resins resulting therefrom have insufficient storage stabilities, and one attains neither the bonding strengths, nor the short pressing times of the resins which are prepared according to the invention. Morever, ammonia is released due to side reactions. This is manifested in an additionally increased alkalinity of the resins, and in annoying odors.

The qualitative examinations of the product modified aqueous solutions of the invention were carried out on triple-layer, 16 mm thick particle boards having an outer-layer/center-layer particle ratio of 35:65. In each test the glue application to the outer-layer particles was 8 wt. % solid resin (dry basis).

Using the low-alkali product modified solutions (alkali content 2 to 6 wt. %), the center-layer particles were glued with 6 wt. % solid resin consisting either solely of oligomeric MDI (4,4'-diphenylmethane diisocyanate) or of 1 part of oligomeric MDI combined with 1 part of solid phenolic resin. In the latter case at first the oligomeric MDI was admixed to the product modified resin solution of the invention and then the mixture sprayed onto the particles.

Using the alkali-rich product modified solutions (alkali content above 6 to 12) the glue application of the outer- and center-layer particles in all cases was 8% solid resin (dry basis).

To make the particles hydrophobic, 1% paraffin (dry basis), as a 50 wt. % paraffin emulsion, was added to the resin solutions. When the center-layer was glued exclusively with oligomerie MDI, the paraffin emulsion was sprayed onto the particles beforehand.

Prior to applying the glue, the particles were dried so that after application of the glue the moisture of the outer-layer particles was 16% whereas the moisture of the center-layer particles was 9.5%. The particles were spread by hand and pressed for 1.9 or 2.4 minutes at 180° C. with 22 bar. The gross densities of the particle boards thus obtained in all cases were 690 kgs/m³.

The viscosities were measured at 20° C.

For determining the solids content, 1 g of substance was dried in a circulating air oven at 120° C. for 2 hours.

For determining the gel time the standard test DIN 16916, part 2 was used.

DESCRIPTION OF PREFERRED EMBODIMENTS

Practice of the process of this invention will be apparent to those skilled in the art from the following wherein all parts are parts by weight unless otherwise stated.

EXAMPLE I

In this example of the best mode presently known of practicing this invention, the following components were employed.

TABLE

| Component | Parts |
|---|---|
| Phenol (10 moles) | 941 |
| Sodium Hydroxide (as 50% aqueous solution) | 288 |
| Formaldehyde (26 moles) (as formalin a 28% aqueous solution of formaldehyde) | 2780 |
| Urea (per 1000 parts resin) | 144 (12.6 wt. %) |

The phenol and sodium hydroxide solution was mixed and heated to 80° C. Thereafter the formalin was added over 80 minutes. The reaction mixture was maintained at 80° C. until the viscosity increased to 900 milliPascal-seconds. The temperature was lowered to 65° C. during which the viscosity increased to 2000 mPa.s. The urea was then added with mixing. At this point the phenol-formaldehyde reaction to form resin was essentially complete.

EXAMPLE II (Control Example)

In this control example, the procedure of Example I was followed except that 144 parts of water were added instead of 144 parts of urea.

EXAMPLE III (Control Example)

In this control example there was added neither urea nor water.

The product resins of each of Examples I, II, and III were analyzed for:
(i) solids content as weight %;
(ii) viscosity (milliPascal-seconds) at 20° C.;
(iii) Gel Time (minutes) at 100° C.;
(iv) alkali wt. % by titration (calculated as NaOH)
(v) alkali wt. % total (calculated as NaOH); and
(vi) Formaldehyde content wt. %

TABLE

| Property | I | II | III |
|---|---|---|---|
| Solids Content % | 45.1 | 32.5 | 37.2 |
| Viscosity mPa.s (20° C.) | 215 | 280 | 2000 |
| Gel Time min. (100° C.) | 15 | 12 | 7 |
| Alkali wt. % (titrated) | 3.0 | 3.0 | 3.4 |
| Alkali wt. % (total) | 3.1 | 3.1 | 3.6 |
| Formaldehyde wt. % | 0.2 | 3.2 | 3.6 |

From the above Table, it is apparent that:
(i) addition of urea permits attainment of product of high solids content;
(ii) addition of urea permits attainment of product of desirably lower viscosity;
(iii) the alkali content of the product is desirably low;
(iv) the content of free formaldehyde drops to 0.2 wt. % due to formation of methylol urea.

In particular, it is noted that the high-condensated resin is characterized by a desirably low viscosity and alkali content.

EXAMPLE IV

In this example, the following components were employed:

TABLE

| Component | Parts |
|---|---|
| Phenol (10 moles) | 941 |
| Sodium Hydroxide (as 50% aqueous solution) | 388 |

TABLE-continued

| Component | Parts |
| --- | --- |
| Formaldehyde (26 moles) (as formalin a 28% aqueous solution of formaldehyde) | 2780 |
| Urea (per 1000 parts resin) | 141 (12.6 wt. %) |

The resin was maintained at 65° C. until the viscosity reached 2000 mPa.s. Reaction was carried out as in Example I.

EXAMPLE V (Control Example)

In this control example, the procedure of Example IV was followed except that no urea was added. The resin was maintained at 65° C. until the viscosity reached 2000 mPa.s. There was then added 50 wt. % aqueous sodium hydroxide solution in amount equivalent to 141 parts thereof per 1000 parts of resin.

EXAMPLE VI (Control Example)

In this control example, the procedure of Example IV was followed except that no urea was added.

The product resins of each Example were analyzed as for Examples I–III:

TABLE

| Property | Example IV | Example V | Example VI |
| --- | --- | --- | --- |
| Solids Content % | 45.1 | 40.0 | 37.6 |
| Viscosity mPa.s (20° C.) | 210 | 205 | 2000 |
| Gel Time min. (100° C.) | 14 | 26 | 7 |
| Alkali wt. % (titrated) | 3.9 | 9.4 | 4.4 |
| Alkali wt. % (total) | 4.2 | 10.3 | 4.7 |
| Formaldehyde wt. % | 0.3 | 1.8 | 3.4 |

From the above Table, it is apparent that (i) addition of urea, as in Example IV, permits attainment of product of high solids content;

(ii) addition of urea permits attainment of product of low viscosity. Control example VI (no urea) shows undesirably high viscosity;

(iii) the alkali content of the product is desirably low. Control Example V shows attainment of low viscosity by addition of caustic—but the alkali content is undesirably high;

(iv) the formaldehyde content of Example IV desirably drops to 0.3 wt. %, the control Examples yielding product containing 1.8 and 3.4 wt. % formaldehyde which is undesirable.

EXAMPLE VII

In this example, the following components were employed:

TABLE

| Component | Parts |
| --- | --- |
| Phenol (11 moles) | 1035 |
| Sodium Hydroxide (as 50% aqueous solution) | 405 |
| Formaldehyde (28.6 moles) as formalin, a 28.7% aqueous solution of formaldehyde | 2985 |
| Urea | 550 (11.1 wt. %) |

The procedure of Example I was followed except that the urea was added at 70° C., and the viscosity of the resin, at the point at which the urea is added, was 1250 mPa.s.

The resin had the following characteristics:

TABLE

| Property | Value |
| --- | --- |
| Solids Content wt. % | 44.7 |
| Viscosity mPa.s (20° C.) | 215 |
| Gel time min (100° C.) | 14 |
| Alkali (titrated) wt. % | 3.8 |
| Alkali (total) wt. % | 4.1 |
| Formaldehyde wt. % | 0.3 |

Figure 1:
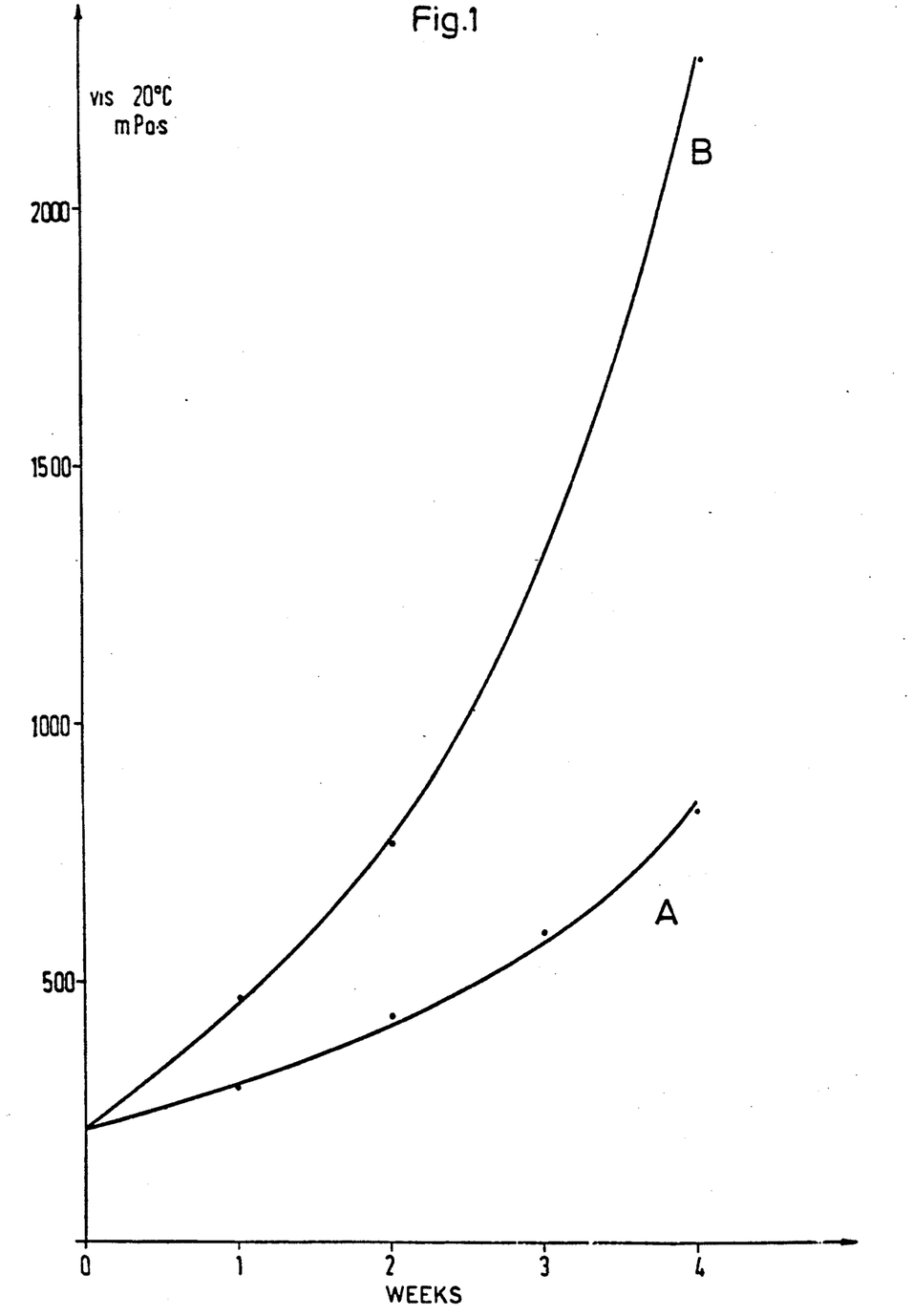

The Storage Stability—the viscosity of the resin used as a function of storage time—is plotted as curve A of FIG. 1. It is apparent that the viscosity remains low over a period of 4 weeks.

For manufacturing the particle boards, 8 wt. % of dry resin (equal to 17.9% of resin solution) and 1 wt. % paraffin (equal to 2 wt. % of a 50 wt. % emulsion in water) are mixed and sprayed onto the particles for the outer-layers. The glue, sprayed onto the particles of the center-layer, consists of a mixture of 3 wt. % MDI, 3 wt. % of solid resin (6.7 wt. % of resin solution) and 1 wt. % of paraffin (2 wt. % of paraffin emulsion), and of 6 wt. % of MDI, respectively. In the case of the application of 6 wt. % of MDI, 2 wt. % of the paraffin emulsion was separately sprayed onto the particles.

The water content of the outer-layer particles was 16 wt. % and that of the center-layer particles was 9.5 wt. % after gluing. The glued particles were spread on a press caul in a ratio of outer- to center-layer of 35 to 65 wt. % and pressed for 1.9 minutes and 2.4 minutes, respectively, at 22 bar and 180° C. to form a triple layer particle board composite. The gross densities of the particle boards were 690 kgs/m$^3$.

EXAMPLE VIII (Control Example)

In this Control Example, the same components were employed as in Example VII. The phenol, sodium hydroxide, and urea were placed into a flask and heated to 80° C. Then the formaldehyde was added over 80 minutes. The condensation reaction was discontinued (by cooling to room temperature) when the viscosity reached 190 mPa.s. The resin had the following characteristics:

TABLE

| Property | Value |
| --- | --- |
| Solids Content wt. % | 44.9 |
| Viscosity mPa.s (20° C.) | 215 |
| Gel Time min. (100° C.) | 17 |
| Alkali (titrated) wt. % | 4.25 |
| Alkali (total) wt. % | 4.1 |
| Formaldehyde wt. % | 0.35. |

The properties of the product resin were tested, and the Storage Stability is plotted as curve B in FIG. 1. It is clear that in this control example, the viscosity increases to an undesirably high level after a few weeks.

It is striking that the titrated alkali is higher than the actually applied sodium hydroxide, caused by a partial decomposition of urea to ammonia.

EXAMPLE IX (Control Example)

In this control example, the preparation and use of an unmodified phenolic resin was carried out as set forth in W. German patent specification No. 29 44 178.

Phenol (225 parts, 2.4 moles) and formalin (400 parts of 37 wt. % aqueous solution of formaldehyde, 4.9 moles) were mixed and heated at 70° C. Over 60 minutes, 80 parts of 50% aqueous solution of sodium hydroxide was added and thereafter 295 parts of water. The temperature was raised to 80° C. When the viscosity reached 190 mPa.s, the batch was cooled.

The resin thus obtained had the following characteristics:

TABLE

| Property | Value |
|---|---|
| Solids content wt. % | 35.1 |
| Viscosity mPa.s (20° C.) | 200 |
| Gel Time min. (100° C.) | 21 |
| Alkali (titrated) wt. % | 3.8 |
| Alkali (total) wt. % | 4.0 |
| Formaldehyde wt. % | 0.2 |

EXAMPLE X (Control Example)

In this control example, a prior art phenol-formaldehyde resin was prepared from the following components:

TABLE

| Component | Parts |
|---|---|
| Phenol (5.37 moles) | 505 |
| 1° Sodium Hydroxide (as a 50% aqueous solution) | 218 |
| 2° Sodium Hydroxide (as a 50% aqueous solution) | 169 |
| Formaldehyde (14 moles) (as 38% formalin) | 1104 |

The phenol and 218 parts of the first sodium hydroxide solution were mixed and heated to 80° C. Over one hour, the formaldehyde was then added. When the viscosity reached 900 mPa.s at 80° C., the temperature was lowered to 70° C. When the viscosity at 70° C. rose to 1700 mPa.s, 169 additional parts of the second sodium hydroxide solution were added and the batch was cooled.

TABLE

| Property | Value |
|---|---|
| Solids content wt. % | 48.1 |
| Viscosity mPa.s (20° C.) | 750 |
| Gel Time min. (100° C.) | 30 |
| Alkali (titrated) wt. % | 8.2 |
| Alkali (total) wt. % | 9.7 |
| Formaldehyde wt. % | 0.3 |

Particle boards were prepared using the resins as set forth in Examples VII, VIII, IX, and X and were tested to determine the following properties:

(i) Moisture content—the wt. % of water in the wood particles (dry basis) prior to application of glue;

(ii) Alkali Load—the wt. % of NaOH in the particle board (dry basis);

(iii) Flexural strength—as measured by DIN 68,763 in N/mm$^2$;

(iv) Tensile strength (perpendicular) V100 as measured by DIN 68,763 in N/mm$^2$;

(v) Swelling—% increase in thickness after immersion in water for 24 hours by DIN 68,763;

(vi) Perforator value—the mg of formaldehyde released per 100 g of particle board (dry basis)—as measured by DIN EN 120.

TABLE

| Particle Board Characteristics | | | | | | |
|---|---|---|---|---|---|---|
| | VII | | VIII | IX | | X |
| 8 w % resin (dry basis) | | | | | | |
| Outer Layer | | | | | | |
| Moisture Content | 7.6 | | 7.6 | 2.6 | | 8.7 |
| Alkali Load | 0.72 | | 0.72 | 0.91 | | 1.61 |
| 6 w % resin (dry basis) | | | | | | |
| | MDI | 3% MDI plus 3% Phenolic Resin | | | | |
| Center Layer | | | | | | |
| Moisture Content | 9.2 | 6.5 | | 6.5 | 4.6 | 7.0 |
| Alkali Load | | 0.27 | | 0.27 | 0.34 | 0.60 |
| Pressing Time min | 2.4 | 1.9 | 2.4 | 2.4 | 2.4 | 2.4 |
| Properties | | | | | | |
| Flexural Strength | 18.5 | 18.0 | 18.5 | 17.1 | 18.0 | 18.6 |
| Tensile Strength | 0.27 | 0.21 | 0.25 | 0.20 | 0.24 | 0.18 |
| Swelling | 9.5 | 9.2 | 8.8 | 9.3 | 9.5 | 10.5 |
| Perforator Value | 3.9 | 3.0 | 4.0 | 4.2 | 4.1 | 4.0 |

From the above tables, the following conclusions may be drawn:

(i) comparison of Example VII and IX reveals that it is unexpectedly possible to obtain, with the instant invention, product having desired characteristics by use of particles which contain a higher moisture content before gluing. For example, the moisture content of the particles of the outer-layers (7.6) and the center-layer (9.2 w % MDI; 6.5 w % MDI and phenolic resin) of Example VII are substantially higher than those (2.6 and 4.6) of Example IX—yet the properties of the product of Example VII are comparable to those of the product of Example IX.

(ii) a comparison of Example VII with e.g. Example IX also reveals that the alkali load of the outer-layer of Example VII (0.72) is less than that of Example IX (0.91) or Example X (1.61). Thus the product of Example VII is characterized by a lower hygroscopicity than is the product of Example IX or of Example X—hygroscopicity being a function of alkali load.

(iii) the flexural strength of the resins of this invention, Example VII, is much better than that of Example VIII and essentially the same as that of the control Examples IX and X.

From FIG. 1, it is also apparent that resins typified by that of Example VII possesses a longer storage stability than control resins typically those of Examples VIII.

(iv) it is possible to obtain satisfactory resins of the instant invention by decreasing the pressing time from the standard 2.4 minutes down to 1.9 minutes. Although the properties of the product resins are somewhat less satisfactory than when pressed for 2.4 minutes, they are still comparable to those of control Examples VIII, IX and X which show a pressing time of 2.4 minutes. The attempt to reduce the pressing time of Example VIII to 1.9 minutes failed since the particle board surfaces stuck to the cauls as a consequence of insufficient curing of the bonding agent.

(v) the tensile strength of the products of this invention are comparable to those of the control products of Example IX. They are superior to those of control Examples VIII and X.

(vi) it is possible to obtain superior perforator values by the process of this invention.

EXAMPLE XI

This example illustrates the viscosity-reducing influence of urea on a highly condensed alkali-rich phenolic resin.

The following components were employed:

TABLE

| Component | Parts |
|---|---|
| Phenol (10 moles) | 941 |
| 1* Sodium Hydroxide (as 50% aqueous solution) | 236 |
| 2* Sodium Hydroxide (as 50% aqueous solution) | 212 |
| 3* Sodium Hydroxide (as 50% aqueous solution) | 440 |
| Formaldehyde (26 mole) (as formalin in a 40% aqueous solution of formaldehyde) | 1960 |
| Urea | 940 (19.9 wt. %) |

The phenol and the first sodium hydroxide solution were placed into a flask and heated to 90° C. Within 80 minutes the formaldehyde was then added while maintaining the temperature. Subsequently the second sodium hydroxide solution was added. At 80° C. the condensation was carried on until the viscosity reached 4,200 mPa.s, and then within 15 minutes the third sodium hydroxide solution was added. The temperature then was lowered to 65° C. and when the viscosity reached 7,200 mPa.s, the reaction was discontinued by charging the urea.

The resin thus obtained had the following characteristics:

TABLE

| Property | Addition of urea Prior to | After |
|---|---|---|
| Solids Content wt. % | 48.4 | 53.5 |
| Viscosity mPa.s (20° C.) | 7,200 | 900 |
| Gel Time min (100° C.) | 8 | 23 |
| Alkali wt. % (titrated) | 10.6 | 8.0 |
| Alkali wt. % (total) | 11.7 | 9.4 |
| Formaldehyde wt. % | 1.5 | 0.3 |

From the above table it is apparent that the addition of urea caused noticeable viscosity drop. The free formaldehyde was nearly completely converted into methylol urea.

EXAMPLE XII

The following components were employed:

TABLE

| Component | Parts |
|---|---|
| Phenol (10 mole) | 941 |
| 1* Sodium Hydroxide (as 50% aqueous solution) | 236 |
| 2* Sodium Hydroxide (as 50% aqueous solution) | 360 |
| Formaldehyde (28 mole) (as formalin in a 40% aqueous solution of formaldehyde) | 2,100 |
| Urea | 720 (16.5 wt. %) |

The phenol and the first sodium hydroxide solution were placed into a flask and heated to 90° C., within 80 minutes the formaldehyde was added, and subsequently the second sodium hydroxide solution was added. The condensation was carried on for 30 minutes at 85° C. The temperature then was lowered within 30 minutes to 65° C., and when the viscosity reached 2,800 mPa.s the urea was added.

The resin thus obtained had the following characteristics:

TABLE

| Property | Value |
|---|---|
| Solids Content wt. % | 53.2 |
| Viscosity mPa.s (20° C.) | 620 |
| Gel Time min (100° C.) | 13 |
| Alkali (titrated) wt. % | 6.1 |
| Alkali (total) wt. % | 6.8 |
| Formaldehyde wt. % | 0.4 |

EXAMPLE XIII (Control Example)

In this control example, the same components were employed as in Example XI.

The phenol, the first sodium hydroxide solution and the urea were placed into a flask, and at 90° C. the formaldehyde was added within 80 minutes while maintaining this temperature. Then within 15 minutes, the second sodium hydroxide solution was added. Within the next 30 minutes the temperature was lowered to 75° C., and at a viscosity of 1,800 mPa.s the third sodium hydroxide solution was added within 15 minutes. The condensation was carried on at this temperature until a viscosity of 900 mPa.s was reached. Then the batch was cooled to room temperature.

The resin having a strong odor of NH$_3$ had the following characteristics:

TABLE

| Property | Value |
|---|---|
| Solids Content wt. % | 54.4 |
| Viscosity mPa.s (20° C.) | 780 |
| Gel Time min (100° C.) | 40 |
| Alkali (titrated) wt. % | 9.7 |
| Alkali (total) wt. % | 9.4 |
| Formaldehyde wt. % | 0.5. |

Using the resins of Examples X, XI and XIII particle boards were prepared and tested to determine the following properties (i) Flexural strength—as measured by DIN 68,763 in N/mm$^2$;

(ii) Tensile strength (perpendicular) V100 as measured by DIN 68,763 in N/mm$^2$;

(iii) Swelling—% increase in thickness after immersion in water for 24 hours by DIN 68,763;

(iv) Perforator value—the mg of formaldehyde released per 100 g of particle board (dry basis)—as measured by DIN EN 120.

TABLE

| Particle Board Characteristics | | | | | | |
|---|---|---|---|---|---|---|
| Type of Board | Triple-Layer-Board | | | | | |
| Glue Application (dry basis) | 8% | | | | | |
| Waterproofing (paraffin/dry wood) | 1% | | | | | |
| Potassium Carbonate/ dry glue in Center-layer | 6% | | | | | |
| Residual Moisture after gluing | | | | | | |
| -Outer-layer particles | 15,7% | | | | | |
| -Center-layer particles | 9,2% | | | | | |
| Pressing temperature | 180° C. | | | | | |
| Pressing Pressure | 22 bar | | | | | |
| | Example XI | | Comparison Examples X | | XIII | |
| Pressing Time, minutes | 2.4 | 3.6 | 2.4 | 3.6 | 2.4 | 3.6 |

TABLE-continued

| Particle Board Characteristics | | | | | | |
|---|---|---|---|---|---|---|
| Flexural Strength | 17.0 | 20.4 | | 18.6 | 15.3 | 16.0 |
| Tensile Strength | 0.20 | 0.26 | Cracks | 0.25 | 0.1 | 0.14 |
| Swelling | 10.4 | 10.7 | | 11.0 | 10.9 | 10.9 |
| Perforator Value | | 4.0 | | | 3.9 | 4.1 |

From the above tables, the following conclusions may be drawn:

(i) Example XI as prepared according to the invention has a significant advantage, with regard to the pressing time, over the conventional phenolic resin of the Example X used at present. Resin of Example XI allows to cut the pressing time by one fourth, the characteristics of the panels prepared with resin of Example XI being comparable to those obtained with the conventional resin X;

(ii) the particle boards prepared with the resin of Example XIII do not meet the specifications. Such a resin is not suitable for commercial use, because neither the tensile strength nor the flexural strength meet the specifications;

(iii) it is possible to obtain good perforator values by the process of this invention.

EXAMPLE XIV

This example illustrates the viscosity-reducing influence of a large amount of urea (50%) on a highly condensed alkali phenolic resin.

The following components were employed:

TABLE

| Components | Parts |
|---|---|
| Phenol (10 moles) | 941 |
| 1. Sodium Hydroxide (as 50% aqueous solution) | 232 |
| 2. Sodium Hydroxide (as 50% aqueous solution) | 160 |
| 3. Sodium Hydroxide (as 50% aqueous solution) | 152 |
| Formaldehyde (26 moles) (as formalin in 40% aqueous solution) (of formaldehydes) | 1950 |
| Urea | 1716 |

The phenol and the first sodium hydroxide solution were placed into a flask and heated to 90° C. Within 80 minutes the formaldehyde was then added while maintaining the temperature. Subsequently the second sodium hydroxide solution was added. At 85° C. the condensation was carried on until the viscosity reached 300 mPa.s and then within 15 minutes the third sodium hydroxide solution was added. The temperature then was lowered to 65° C. and when the viscosity reached 1800 mPa.s (measured at 50° C.) the reaction was discontinued by charging the urea.

The resin thus obtained had the following characteristics:

TABLE

| Property | Addition of urea | |
|---|---|---|
| | Prior to | After |
| Solid Content, wt. % | 48.7 | 61 |
| Viscosity mPa.s | 1800[1] | 370[2] |
| Gel Time min. (100° C.) | 3 | 20 |
| Alkali, wt. % (titrated) | 7.1 | 4.8 |
| Alkali, wt. % (total) | 7.9 | 5.3 |
| Formaldehyde, wt. % | 3.6 | 0.2 |

[1] measured at 50° C.
[2] measured at 20° C.

From the above table it is apparent that the addition of urea caused a noticeable viscosity reduction. The free formaldehyde was nearly completely converted into methylol urea.

We claim:

1. A process for preparing a product aqueous solution of a high molecular weight phenol-formaldehyde condensation resin of reduced viscosity which comprises:
   adding to a charge aqueous solution of a phenol-formaldehyde condensation resin having a viscosity above 300 mPa.s (at 20° C.) with a solids content of 20 to 65 weight percent and containing about 2 to about 16 weight percent alkali, urea in amount of 5 to 50 weight percent, based on said resin solution.

2. The process for preparing a product aqueous solution of said phenol-formaldehyde condensation resin of reduced viscosity as claimed in claim 1 wherein said urea is added in amount of 10 to 40 weight percent.

3. The process for preparing a product aqueous solution of said phenol-formaldehyde condensation resin of reduced viscosity as claimed in claim 1 having 2 to 6 weight percent alkali (by titration).

4. The process for preparing a product aqueous solution of said phenol-formaldehyde condensation resin of reduced viscosity as claimed in claim 1 having 2 to 6 weight percent alkali (by titration) and wherein said urea is added in amount of 10 to 50 weight percent.

5. The process for preparing a product aqueous solution of said phenol-formaldehyde condensation resin of reduced viscosity as claimed in claim 1 having about 6 to 12 weight percent alkali (by titration).

6. The process for preparing a product aqueous solution of said phenol-formaldehyde condensation resin of reduced viscosity as claimed in claim 1 having about 6 to 12 weight percent alkali (by titration) and wherein said urea is added in amount of 10 to 50 weight percent.

7. The process for preparing a product aqueous solution of said phenol-formaldehyde condensation resin of reduced viscosity as claimed in claim 1 wherein said alkali is sodium hydroxide.

8. A process for preparing a product aqueous solution of a high molecular weight phenol-formaldehyde condensation resin of reduced viscosity having 2 to 12 weight percent alkali (by titration) which comprises:
   reacting phenol and formaldehyde in the presence of an aqueous solution of alkali thereby forming a charge aqueous solution of phenol-formaldehyde condensation resin having a viscosity above 300 mPa.s (measured at 20° C.) with a solids content of 20 to 65 weight percent and containing about 2 to about 16 weight percent alkali, and
   adding to said aqueous solution of a phenol-formaldehyde condensation resin urea in amount of 5 to 50 weight percent, based on said resin solution.

9. The process for preparing a product aqueous solution of said phenol-formaldehyde condensation resin of reduced viscosity having 2 to 12 weight percent alkali (by titration) as claimed in claim 8, wherein said urea is added in amount of 10 to 40 weight percent.

10. The process for preparing a product aqueous solution of said phenol-formaldehyde condensation resin of reduced viscosity having 2 to 12 weight percent alkali (by titration) as claimed in claim 8 wherein said alkali is present in amount of 2 to 6 weight percent.

11. The process for preparing a product aqueous solution of said phenol-formaldehyde condensation resin of reduced viscosity having 2 to 12 weight percent alkali (by titration) as claimed in claim 8 wherein said alkali is present in amount of 2 to 6 weight percent and wherein said urea is added in amount of 10 to 40 weight percent.

12. The process for preparing a product aqueous solution of said phenol-formaldehyde condensation resin of reduced viscosity having 2 to 12 weight percent alkali (by titration) as claimed in claim 8 wherein said alkali is present in amount of about 6 to 12 weight percent (by titration).

13. The process for preparing a product aqueous solution of said phenol-formaldehyde condensation resin of reduced viscosity having 2 to 12 weight percent alkali (by titration) as claimed in claim 8 wherein said alkali is present in amount of about 6 to 12 weight percent (by titration) and wherein said urea is added in amount of 20 to 40 weight percent.

14. The process for preparing a product aqueous solution of said phenol-formaldehyde condensation resin of reduced viscosity having 2 to 12 weight percent alkali (by titration) as claimed in claim 8 wherein said alkali is sodium hydroxide.

15. An aqueous solution of a high-molecular weight phenol-formaldehyde condensation resin of reduced viscosity having 2 to 12 weight percent alkali (by titration) prepared by the process which comprises:
adding to an aqueous solution of a phenol-formaldehyde condensation resin having a viscosity above 300 mPa.s (at 20° C.) with a solids content of 20 to 65 weight percent and containing about 2 to about 16 weight percent alkali, urea in amount of 5 to 50 weight percent.

16. A process for preparing a product aqueous solution of a high molecular weight phenol-formaldehyde condensation resin characterized by a solids contents of about 20 to 65 weight percent and a viscosity of about 100–1,000 mPa.s (at 20° C.) which comprises:
forming a high viscosity phenol-formaldehyde condensation resin having a viscosity above 300 mPa.s (at 20° C.) and a solids content of about 20–65 weight percent and an alkali content of about 2–16 weight percent;
adding urea, in amount of 10–50 weight percent based on said resin, to said high viscosity phenol-formaldehyde condensation resin thereby forming a low viscosity phenol-formaldehyde condensation resin characterized by a lower viscosity than that of said high viscosity phenol-formaldehyde condensation resin, an increased solids content and an alkali content of about 2–16 weight percent and
recovering said low viscosity phenol-formaldehyde condensation resin.

* * * * *